Patented July 12, 1949

2,476,252

UNITED STATES PATENT OFFICE 2,476,252

REACTION PRODUCT OF STYRENE OXIDE

Charles A. Thomas, St. Louis, Mo., and Carroll A. Hochwalt, Dayton, Ohio, assignors to Monsanto Chemical Company, St. Louis, Mo., a corporation of Delaware No Drawing. Application August 30, 1945, Serial No. 613,716

4 Claims. (Cl. 260—410.5)

The present invention relates to reaction products of styrene oxide with certain carboxylic acids or acid anhydrides.

According to the invention, di-esters of styrene glycol having the following general formula:

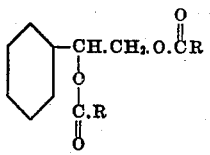

are provided wherein R represents an aliphatic hydrocarbon residue of from 3 to 11 carbon atoms. As preferred examples of compounds having the above general structure may be mentioned styrene glycol dibutyrate, styrene glycol divalerate, styrene glycol dicaproate, styrene glycol dicaprylate and styrene glycol dilaurate, etc.

It is known that aliphatic alkylene oxides, for example, ethylene oxide, react with carboxylic acids to yield esters of glycols, for example, mono- or di-esters of ethylene glycol or mixtures of the same. However, the prior art records contradictory results in the reaction of aromatic substituted alkylene oxides with carboxylic acids or functional derivatives thereof. For example, Jörlander (Ber. 50, 407 (1917)) reacted a series of 1-aryl-2-aroyl ethylene oxides with acetic anhydride in presence of sulfuric acid and obtained the corresponding 1-aryl-2-aroyl ethylene glycol diacetates. On the other hand, Lutz and Wilder (J. Amer. Chem. Soc. 56, 1988 (1934)) report that 1,2-dibenzoylethylene oxide is stable toward acetyl chloride, acetic anhydride (with sulfuric acid), or boiling glacial acetic acid. Likewise, o-nitrophenylethylene oxide with acetic anhydride in presence of ferric chloride does not give the corresponding diacetylglycol; instead there is formed the acetate of nitrosobenzoylcarbinol (Arndt, Eisterst and Partale. Ber. 61, 1107–18 (1928)). Moreover, it is known that ferric chloride is a catalyst which gives good results in the preparation of glycol esters from ethylene oxide and carboxylic acids or anhydrides thereof.

From the previous art, then, it is obvious that the course of the reaction of aromatically substituted ethylene oxides with carboxylic acids or acid anhydrides is quite unpredictable. Apparently, the course of the reaction is a function of the aromatic substituent; that is, the ease with which the ethylene oxide ring is ruptured and the carbon atom at which rupture occurs depends upon the type and character of substituent. As far as we have been able to ascertain, the effect of the single phenyl substituent, as in styrene oxide, upon the reactivity of aryl-substituted olefin oxides with carboxylic acids or acid anhydrides has not been heretofore determined.

Now we have found that the reaction of styrene oxide with certain aliphatic carboxylic acids and mixtures of such acids or anhydrides thereof results in the production of di-esters of styrene glycol. Whereas in reactions effected with ethylene oxide or alkyl-substituted ethylene oxides and aliphatic carboxylic acids the reaction product generally consists of a mixture of mono-ester and diester, with styrene oxide only the diesters are obtained.

For the production of the present diesters of styrene glycol we proceed substantially as follows: We reflux styrene oxide with an excess of a saturated, unsubstituted carboxylic acid or mixture of such acid and acid anhydride in the presence of an acidic catalyst for from 2 to 12 hours, neutralize the reaction mixture in order to remove any unreacted acid, and separate the ester, for example, by fractionation under partial vacuum. As the aliphatic carboxylic acid we may employ any acid of the general formula:

<p style="text-align:center">R.COOH</p> where R is an aliphatic hydrocarbon residue of from 3 to 11 carbon atoms. As preferred examples of carboxylic acids having the above general formula may be mentioned butyric acid, valeric acid, isovaleric acid, caproic acid, capric acid, and lauric acid.

The present diesters of styrene glycol constitute a highly useful class of compounds, finding application in the industry as plasticizers for natural or synthetic resins, coatings, etc., and as intermediates in the preparation of wetting, foaming and detersive agents.

The invention is illustrated, but not limited, by the following examples:

Example 1

Add 24 g. (0.2 mol) of styrene oxide to a cold mixture consisting of 53 g. (0.6 mol) of butyric acid, 100 cc. of toluene and 0.5 g. of p-toluenesulfonic acid. This mixture is then refluxed for 5 hours, during which time the water formed is removed by means of a trap, and then an additional 5 cc. of butyric acid is added to the reaction mixture and refluxing is continued for 2½ hours. At the end of this time there is added 15 cc. of butyric acid, the refluxing is continued for 4 hours, and the reaction mixture is subsequently allowed to cool to room temperature. After washing with aqueous sodium bicarbonate the whole is distilled under partial vacuum and there is thus obtained 24 g. of a fraction, B. P. 181° C. to 241° C. at 18 mm., from which by redistillation there is obtained the hitherto unknown styrene glycol dibutyrate, B. P. 170° C. to 185° C. at 12 mm., $n_D^{25}$ 1.4917, $D_{25}^{25}$ 1.062

$M_R$ calcd. 75.8, $M_R$ found 76.0, and analyzing as follows:

|  | Per cent C | Per cent H |
|---|---|---|
| Found | 69.43 | 7.77 |
| Calcd. for $C_{14}H_{19}O_4$ | 69.10 | 7.92 |

Example 2

Reflux for 14 hours, a mixture of 0.5 g. p-toluene sulfonic acid, 58 g. of caprylic acid, 24 g. styrene oxide and 100 cc. of toluene. Dilute with water and benzene, wash with water to remove the p-toluene sulfonic acid and then with water containing a little sodium bicarbonate. Distil the product over the range 180° C. to 290° C. at 10 mm. Yield 60 g. Redistil collecting the fraction boiling over the range 225° C. to 245° C. at 9 mm. This fraction contains styrene glycol dicaprylate.

Example 3

Under conditions similar to those described in Example 2 above, treat a mixture of 41 g. of isovaleric acid and 24 g. of styrene oxide. Wash and distil the product, obtaining a fraction boiling over the range 190° C. to 200° C. at 14 mm. This fraction contains styrene glycol diisovalerate.

Example 4

Under conditions similar to those employed in Example 2 above, react a mixture containing 46 g. of caproic acid and 24 g. of styrene oxide. Wash and distil the product, collecting the fraction boiling over the range 201° C. to 211° C. at 9 mm. This fraction contains styrene glycol dicaproate.

Example 5

Reflux for 10½ hours a mixture consisting of 50 g. (0.25 mol) of lauric acid, 100 cc. of toluene, 1 g. of p-toluenesulfonic acid and 15 g. (0.125 mol) of styrene oxide. Allow the reaction mixture to cool to room temperature, wash it with aqueous sodium bicarbonate, and distil under partial vacuum, collecting the fraction B. P. 180° C. to 233° C. at 3 mm. Dissolve this fraction in benzene, filter into a Claisen flask, add 1 cc. of glacial acetic acid to the filtrate and distil the resulting mixture under partial vacuum. In this manner there is obtained a fraction B. P. 229° C. to 270 C. at 3 mm., which fraction solidifies upon cooling in ice to yield a solid that is miscible with hexane and soluble in alcohol. Two recrystallizations of the solid from alcohol yield the substantially pure and hitherto unknown styrene glycol dilaurate, M. P. 33° C. to 34° C., and analyzing as follows:

|  | Percent C | Percent H |
|---|---|---|
| Found | 76.73 | 10.65 |
| Calcd. for $C_{31}H_{54}O_4$ | 76.50 | 10.76 |

Instead of the specific acids disclosed in the above examples, we may use other aliphatic carboxylic acids for the preparation of the corresponding styrene glycol diesters, the reaction of styrene oxide with such acids as butyric acid, valeric acid, caproic acid, heptoic acid, caprylic acid, capric acid, or lauric acid in the presence of an acidic catalyst resulting in the production of the corresponding diester of styrene glycol. Likewise, instead of employing sulfuric acid or toluene sulfonic acid as reaction catalyst, we may employ other acids or acid-reacting salts, for example, phosphoric acid, hydrochloric acid, naphthalene-sulfonic acid, sodium bisulfate, ferric chloride, aluminum chloride, etc.

The carboxylic acids, themselves, may be replaced by mixtures of the carboxylic acid and the corresponding anhydride thereof. The reaction may be effected in presence of a solvent or a diluent, the employment of a solvent being generally advantageous.

This application is a continuation-in-part of our abandoned application Serial No. 466,686, filed November 23, 1942.

What we claim is:

1. Compounds of the formula:

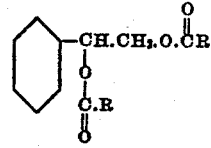

where R is an aliphatic saturated hydrocarbon radical of from 3 to 11 carbon atoms.
2. Styrene glycol dibutyrate.
3. Styrene glycol dilaurate.
4. Styrene glycol dicaprylate.

CHARLES A. THOMAS.
CARROLL A. HOCHWALT.

REFERENCES CITED

The following references are of record in the file of this patent:

Dauben et al., J. Am. Chem. Soc., vol. 63, pp. 1883–5 (1941).